(12) United States Patent
Aggarwal

(10) Patent No.: US 7,813,525 B2
(45) Date of Patent: Oct. 12, 2010

(54) METHOD AND APPARATUS FOR DETECTING SUSPICIOUS ACTIVITIES

(75) Inventor: Manoj Aggarwal, Plainsboro, NJ (US)

(73) Assignee: Sarnoff Corporation, Princeton, NJ (US)

( * ) Notice: Subject to any disclaimer, the term of this patent is extended or adjusted under 35 U.S.C. 154(b) by 1443 days.

(21) Appl. No.: 11/141,954

(22) Filed: Jun. 1, 2005

(65) Prior Publication Data

US 2005/0281435 A1 Dec. 22, 2005

Related U.S. Application Data

(60) Provisional application No. 60/575,996, filed on Jun. 1, 2004, provisional application No. 60/576,051, filed on Jun. 1, 2004, provisional application No. 60/579,826, filed on Jun. 15, 2004.

(51) Int. Cl.
*G06K 9/00* (2006.01)

(52) U.S. Cl. .................. 382/103; 382/107; 348/143

(58) Field of Classification Search ............... 382/100, 382/103, 107, 224, 236, 270; 348/47, 147, 348/169, 143
See application file for complete search history.

(56) References Cited

U.S. PATENT DOCUMENTS

| | | | | |
|---|---|---|---|---|
| 6,985,172 | B1 * | 1/2006 | Rigney et al. | 348/169 |
| 7,336,803 | B2 * | 2/2008 | Mittal et al. | 382/103 |
| 2003/0085992 | A1 * | 5/2003 | Arpa et al. | 348/47 |
| 2004/0017929 | A1 | 1/2004 | Bramblet et al. | |

OTHER PUBLICATIONS

Stringa et al. ("Real-Time Video-Shot Detection for Scene Surveillance Application," IEEE Transactions on Image Processing, vol. 9, No. 1, Published on Jan. 2000, pp. 69-79).*

* cited by examiner

*Primary Examiner*—Duy M Dang
(74) *Attorney, Agent, or Firm*—Lowenstein Sandler PC

(57) ABSTRACT

A method and apparatus for detecting suspicious activities is disclosed. In one embodiment at least one low-level feature set is detected in a plurality of frames of a sequence of scene imagery. The frame-to-frame associations of the detected low-level feature set are determined, and suspicious activities is identifying on the bases of these frame-to-frame associations.

29 Claims, 2 Drawing Sheets

METHOD AND APPARATUS FOR DETECTING SUSPICIOUS ACTIVITIES

CROSS-REFERENCE TO RELATED APPLICATIONS

This application claims benefit of U.S. provisional patent application Ser. No. 60/575,996, filed Jun. 1, 2004, U.S. provisional patent application Ser. No. 60/576,051, filed Jun. 1, 2004, and U.S. provisional patent application Ser. No. 60/579,826, filed Jun. 15, 2004, all of which are herein incorporated by reference in their entireties.

BACKGROUND OF THE INVENTION

In certain sensitive locations where security is a concern (e.g., airports, train stations, military bases), people and objects are often closely monitored to detect suspicious (e.g., potentially dangerous and/or malicious) activities such as loitering, the breach of secure perimeters, the leaving of objects (e.g., unattended bags, stopped vehicles, etc.) and other activities that might indicate a security threat.

Typically, object tracking applications for monitoring such activities operate as single-track solutions for each monitored person or object, and decisions regarding activities (e.g., loitering, perimeter breach, left objects, etc.) are made on that single track. Such approaches are prone to errors, however, due to confusion caused, for example, by occlusions and the merging of multiple objects. These errors often result in false alarms being generated, e.g., where innocent activities or movement are mistaken for suspicious activities. Thus, a significant amount of time and resources may be wasted on relatively trivial occurrences and panic may be unnecessarily generated. Alternatively, methods that operate on a reduced sensitivity in order to compensate for this tendency to generate false alarms often tend to overlook real security threats, which can also have disastrous consequences.

Therefore, there is a need in the art for a method and apparatus for detecting suspicious activities that is capable of reliably detecting such activities with a low false alarm rate.

SUMMARY OF THE INVENTION

The present invention generally discloses a method and apparatus for detecting suspicious activities. In one embodiment at least one low-level feature set is detected in a plurality of frames of a sequence of scene imagery. The frame-to-frame associations of the detected low-level feature set are determined, and suspicious activities is identifying on the bases of these frame-to-frame associations.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

The present invention discloses a method and apparatus for detecting suspicious activities (e.g., loitering, perimeter breach and the like) in monitored locations such as airports, office buildings and bridges or tunnels. In one embodiment, the present invention reduces false detection alarms by tracking low-level feature sets (representing people, objects, etc.) in a series of image frames over time. By identifying the relationships between the detected feature sets over time, it is substantially less likely that events such as occlusions or the merging of objects will generate a detection alarm, as is often the case with existing detection systems.

Figure 1:
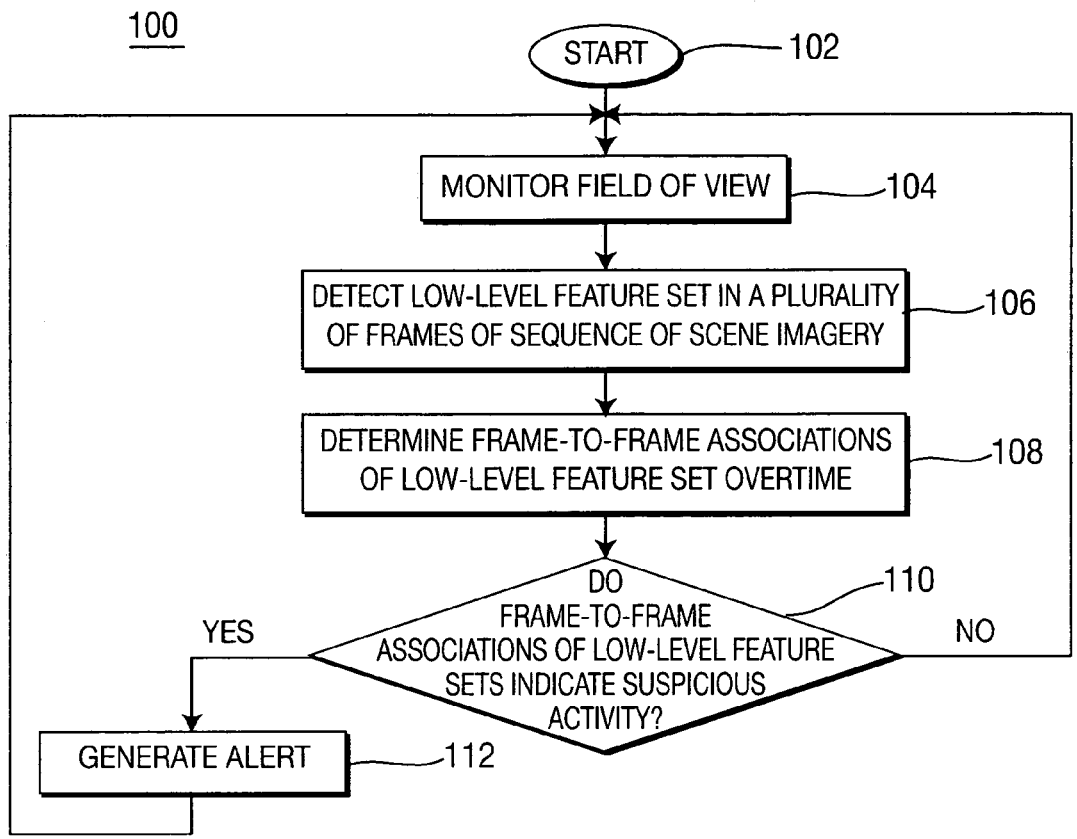
FIG. 1 is a flow diagram illustrating one embodiment of a method for detecting suspicious activities.

FIG. 1 is a flow diagram illustrating one embodiment of a method 100 for detecting suspicious activities, e.g., in a monitored location such as an airport, a train station or a military base. Specifically, the method 100 detects suspicious activities, such as loitering or perimeter breach, in a given field of view (e.g., representing at least a portion of the monitored location as defined by the placement of one or more cameras). The method 100 is initialized at step 102 and proceeds to step 104, where the method 100 monitors the field of view.

In step 106, the method 100 detects at least one low-level feature set (e.g., a "blob") in a plurality of frames of a sequence of scene imagery (e.g., a video stream) representing the field of view. In one embodiment, at least one low-level feature set is detected in every batch of N frames. In one embodiment, the detected low-level feature set is a non-fixed part of the scene imagery's landscape, such as a person or a loose article or object. The batch size, N, is variable according to the requirements of the detection application. For example, a large value may be chosen for N in order to facilitate the detection of slow-moving low-level feature sets, while a smaller N may be adequate for detecting low-level feature sets that move more quickly.

Once the method 100 detects the low-level feature set, the method 100 proceeds to step 108 and determines the frame-to-frame associations or relationships of the detected low-level feature set over a given plurality of frames (e.g., comprising M batches of N frames, where M is at least one). For example, the method 100 may determine that a plurality of low-level feature sets detected in a plurality of respective frames is actually the same single low-level feature set moving through the plurality of frames at different times. Thus, the method 100 can determine what the movement of a given low-level feature set is over a number of frames spanning a specified period of time. In one embodiment, this is accomplished in accordance with optical flow-based analysis, e.g., by establishing an association between low-level feature sets in two adjacent pairs of frames. In one embodiment, this frame-to-frame association is cascaded over N frames, and the history of the association over M batches of N frames is modeled as a directed graph, as described in further detail with respect to FIG. 2. Hence, the duration MN represents the period over which object tracks are analyzed for suspicious activities.

In step 110, the method 100 determines whether the frame-to-frame associations of the low-level feature set, as determined in step 108, indicate suspicious activities in the field of view. In one embodiment, the determination as to whether the frame-to-frame associations of the low-level feature set indicates or represents suspicious activities is calculated based on one or more predefined criteria that are tailored to a specific type of suspicious activities to be detected, as discussed in further detail below. In one embodiment, at least some of these criteria are user definable.

If the method 100 determines in step 110 that suspicious activity is indicated by the frame-to-frame associations of the low-level feature set, the method 100 proceeds to step 112 and generates an alert (e.g., an alarm). The method 100 then returns to step 104 and proceeds as described above (e.g., continues to monitor the field of view for suspicious activities). Alternatively, if the method 100 determines in step 110 that suspicious activity is not indicated by the frame-to-frame associations of the low-level feature set, the method 100 returns directly to step 104.

The method 100 thereby substantially reduces false detection alarm rates by tracking low-level feature sets (representing people, objects, etc.) in a series of image frames over time. By identifying the relationships between the detected feature sets over time, it is substantially less likely that events such as occlusions or the merging of objects will generate a detection alarm, as is often the case with existing detection systems. A significant amount of time and resources that might otherwise be wasted on false alarms may thus be conserved for situations in which they are genuinely needed. Moreover, genuine security threats are more readily detected and are less likely to be overlooked.

Figure 2:
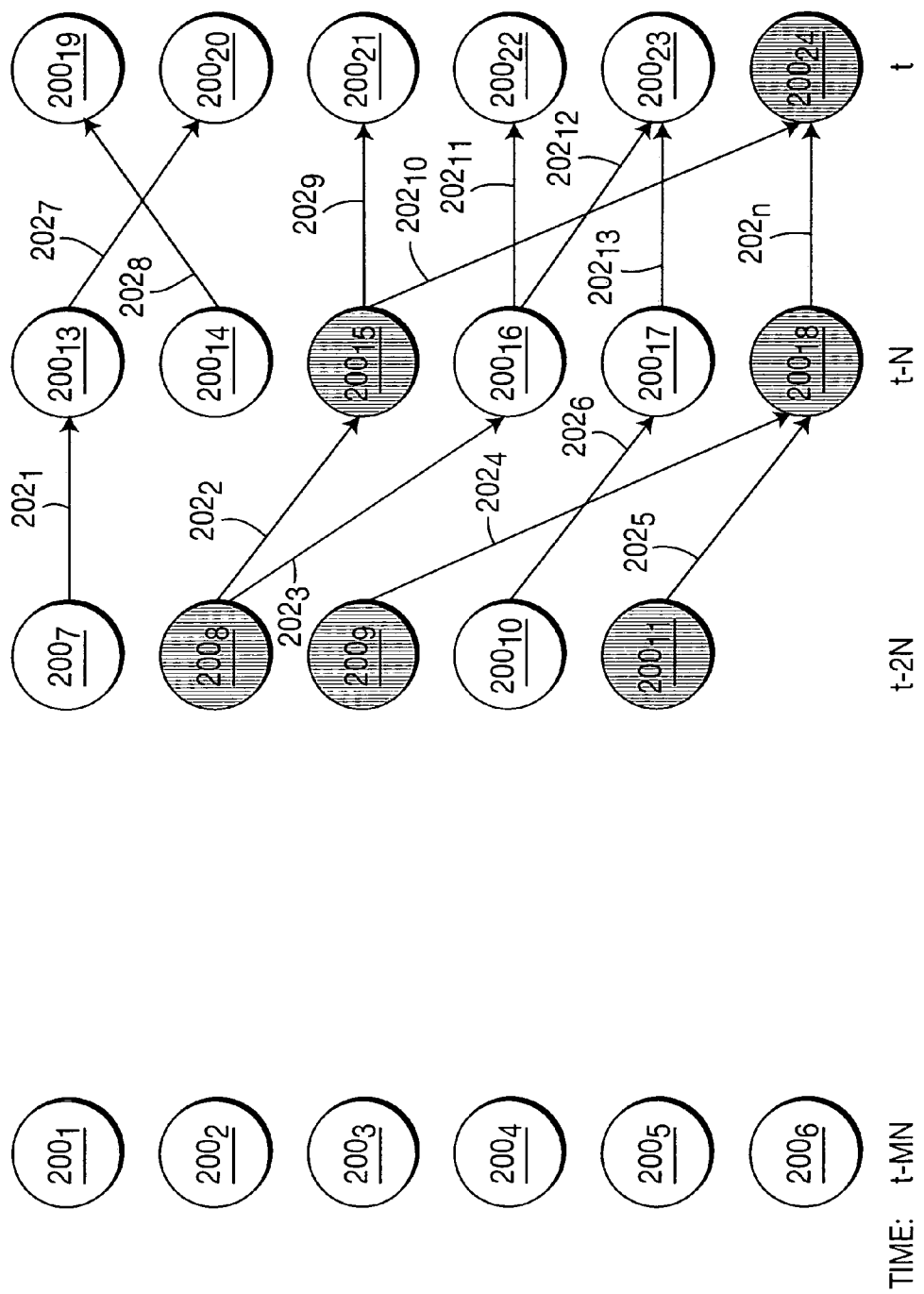
FIG. 2 is a directed (connectivity) graph illustrating the movement of a plurality of exemplary low-level feature sets over time.

FIG. 2 is a directed (connectivity) graph illustrating the movement of a plurality of exemplary low-level feature sets over time. Specifically, the graph is one means of representing the frame-to-frame association or relationship of the exemplary low-level feature sets, in accordance with step 108 of the method 100. In one embodiment, the graph is generated in accordance with the methods described in U.S. patent application Ser. No. 10/638,984, filed Aug. 12, 2003, which is herein incorporated by reference in its entirety.

The graph comprises a plurality of nodes $200_1$-$200_n$ (hereinafter collectively referred to as "nodes 200"), which represent low-level feature sets (e.g., people or objects appearing in the field of view of a camera) at different times (e.g., times t-MN, t-2N, t-n and t). The nodes 200 are connected to other nodes 200 by arcs $202_1$-$202_n$ (hereinafter collectively referred to as "arcs 202"), which represent connections established by flow-based analysis between nodes 200 at adjacent time instants. One or more connecting arcs 202 form a path that represents the connectivity of nodes 200 (i.e., low-level feature sets) across time and corresponds to one possible association of low-level feature sets as established by optical flow. In addition to connectivity information, a weight can also be associated with each arc 202, where the weight provides a measure of confidence that the two nodes 200 connected by an arc 202 are related.

As illustrated, the batch size may also be thought of as a size (e.g., number of frames) of a "hop" backward that is made to look for features of a low-level feature set detected at time t. The total number M of batches may also be thought of as a number of such hops that is made in order to track the detected low-level feature set over a period of time approximately equal to t–(t-MN). Thus, for example, if the method 100 detects a low-level feature set at time t, the method 100 may go back three frames (where the batch size N=3) in order to see if that same low-level feature set is present at time t-3. Once a single feature set is computed, the method 100 may go back three more frames, and then three more frames, until a time period spanning fifteen frames is covered, starting at time t-15 and ending at time t (where MN=15 and M=5).

The generality of the graph also enables the graph to encode splitting and merging events that are the results of movement of low-level feature sets. For example, the single node $200_n$, which has multiple parents at time t-N (i.e., nodes $200_{15}$ and $200_{18}$) and at time t-2N (i.e., nodes $200_8$, $200_9$ and $200_{11}$), could represent an eventual merging at time t of three nodes (low-level feature sets).

In essence, the arcs 202 are paths that represent the movement of the nodes 200 over time. The paths created by the arcs 202 may be analyzed to determine whether the movement (or lack of movement) of any nodes 200 is indicative of suspicious behavior (e.g., loitering, perimeter breach, or object leaving). As discussed above, in some embodiments, this analysis is guided by a number of criteria, some or all of which may be user definable.

For example, in one embodiment, the method 100 is tailored to detect loitering (e.g., where a person or object stays within an environment or location, possibly moving around, for an unusually long period of time). In such a case, it is desirable for the method 100 to identify as loitering instances such as a person slowly pacing back and forth in front of a building entrance. On the other hand, it is not desirable for the method 100 to identify as loitering instances such as a tree swaying in the wind or a person walking slowly from one end of a field of view to another end of the field of view.

Thus, in accordance with the determination of the frame-to-frame associations of low-level feature sets (i.e., as represented by the directed graph of FIG. 2), loitering is in one embodiment defined as a situation in which, given a low-level feature set at time t, the low-level feature set's observed path satisfies the following criteria (e.g., assessed at step 108 of the method 100):

(1) The path has a minimum length of L units. This condition substantially prevents a loitering alert from being generated for innocent activities, such as a person remaining in the monitored field of view for a "normal" period of time. Thus, the condition requires the person or object represented by the low-level feature set to be present in the field of view for a minimum duration of L units of time, determined by measuring the "usual" amount of time that a person or object is expected to remain in the field of view. The sensitivity of the method 100 may be tuned by reducing or increasing the value of L (i.e., reducing or increasing what is considered the "usual" amount of time to remain in the field of view). For example, L may be chosen such that its value is greater during the night than it is during the day;

(2) The confidence weight associated with the path is at least C. This condition prunes out observed paths for which the associated confidence or weight is less than a specified threshold. The sensitivity of the method 100 may be tuned by increasing or decreasing this threshold C;

(3) The displacement during approximately the first half of the path is at least D units. This condition reduces the chances of a false loitering alert being generated for trivial activities such as swaying bushes or trees. It is assumed that even if a person remains within a small radius of space, he or she probably arrived at that radius from another location. The sensitivity of the detection method 100 may be heightened by decreasing the value of D (in the extreme case of D=0, the information provided by this condition is less meaningful);

(4) The displacement over the entire path is no more than E units. This condition reduces the chances of a false loitering alert being generated for paths that include merging events (e.g., Person A walks from the left side of the field of view to the right side of the field of view, where he meets person B, who is walking in the opposite direction. Person B then walks from the right side of the field of view to the left side of the field of view, where he meets person C, who is walking in the opposite direction, etc. This whole exchange may be represented by a single path that satisfies conditions 1 through 3, in which none of the people or objects represented by the low-level feature sets were, individually, considered to be loitering). Thus, this condition assumes that a loitering person will typically remain within a small radius of space. The sensitivity of the method 100 can be heightened by increasing the value of E (in the extreme case of E=the field of view diagonal, the information provided by this condition is less meaningful); and (5) The median instantaneous speed along the path is no greater than S units. This condition assumes that a loiterer will move relatively slowly. The sensitivity of the method 100 can be heightened by increasing the value of S (in the extreme case where S has a very large value, the information provided by this condition is less meaningful).

In another embodiment, the method 100 is tailored to detect perimeter breaches (e.g., where an object or person crosses from a region of a first type into a region of a second type). In such a case, it is desirable for the method 100 to identify as perimeter breaches instances such as a person or object crossing a secure physical perimeter, or crossing from an insecure zone into a secure zone having no physical perimeters. On the other hand, it is not desirable for the method 100 to identify as perimeter breaches instances such as a person or object moving on one side of a (physical or non-physical perimeter), or moving cloud shadows transgressing a perimeter.

Thus, in accordance with the determination of the frame-to-frame location of low-level feature sets (i.e., as represented by the directed graph of FIG. 2), a perimeter breach is in one embodiment defined as a situation in which, given a low-level feature set at time t, the low-level feature set's observed path satisfies the following criteria (e.g., assessed at step 108 of the method 100):

(1) The path originates in a first region $r_1$. This condition establishes a point of origin for the low-level feature set represented by the path;

(2) The path terminates or crosses into in a second region $r_2$, which is separated from the first region $r_1$ by a secure border or perimeter. This condition establishes a point of termination or transgression for the low-level feature set represented by the path, which is located in a separate region from the low-level feature set's point of origin;

(3) The path has a maximum length of MN units. This condition reduces the chances that a false perimeter breach alert will be generated for innocent activities such as a low-level feature set moving entirely on one side of a perimeter or a cloud shadow transgressing the perimeter. The sensitivity of the method 100 may be heightened by decreasing the value of MN;

(4) The confidence weight associated with the path is at least C. This condition prunes out observed paths for which the associated confidence or weight is less than a specified threshold. The sensitivity of the method 100 may be tuned by increasing or decreasing this threshold C. For example, in the extreme case where the C=0, all possible paths of minimum path length MN would be analyzed for potential perimeter breaches;

(5) The average velocity along the path as it crosses from the first region $r_1$ into the second region $r_2$ is at least $V_{min}$ and at most $V_{max}$. This condition controls the types of objects that may (or may not) be detected or identified as breaching the perimeter. For example, in some applications, activities such as a bird flying across the perimeter should not trigger an alarm;

(6) The instantaneous velocity of the path at the time that the path enters the second region $r_2$ is at least $I_{min}$ and at most $I_{max}$. Like condition (5), this condition controls the types of objects that may (or may not) be detected or identified as breaching the perimeter;

(7) The instantaneous direction with a programmable angular tolerance of the path at the time that the path enters the second region $r_2$ is directed toward the second region $r_2$. Like conditions (5) and (6), this condition controls the types of objects that may be detected or identified as breaching the perimeter; and (8) The percentage of the associated low-level feature set that lies in the second region $r_2$ is at least P. This condition reduces the chances of an alarm being generated where incidental features (e.g., shadows) of a moving object (represented by the low-level feature set) may breach the perimeter, but the moving object itself does not (or does not substantially breach the perimeter).

In addition, the determination of perimeter breaches may be tuned by adjusting the separation of the first and second regions $r_1$ and $r_2$. Thus, essentially, the method 100 detects paths created by the movement of low-level feature sets, where the paths have their origins in a first region $r_1$ and a termination or intermediate point in a second region $r_2$.

Figure 3:
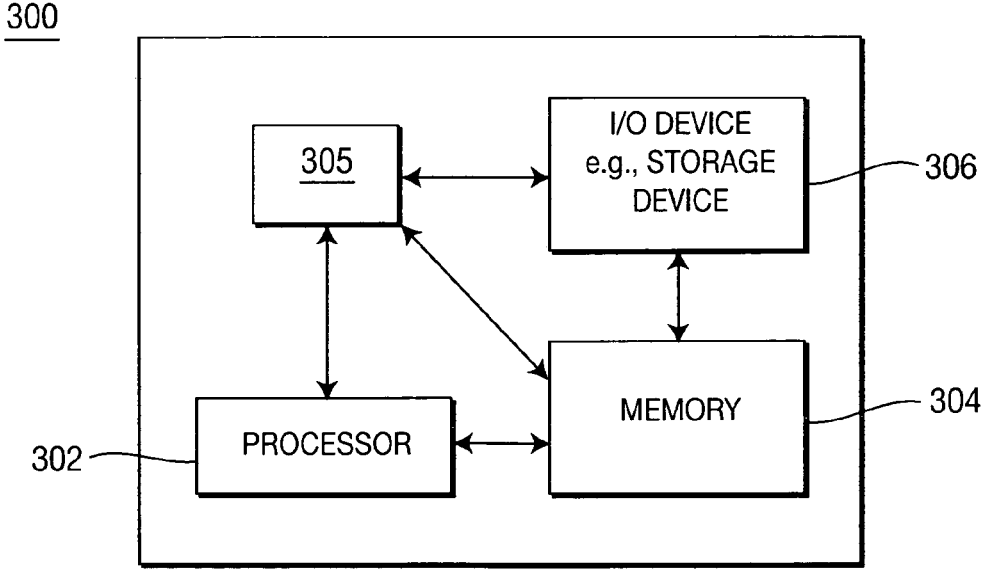
FIG. 3 is a high level block diagram of the activity detection method that is implemented using a general purpose computing device.

FIG. 3 is a high level block diagram of the activity detection method that is implemented using a general purpose computing device 300. In one embodiment, a general purpose computing device 300 comprises a processor 302, a memory 304, an activity detection module 305 and various input/output (I/O) devices 306 such as a display, a keyboard, a mouse, a modem, and the like. In one embodiment, at least one I/O device is a storage device (e.g., a disk drive, an optical disk drive, a floppy disk drive). It should be understood that the activity detection module 305 can be implemented as a physical device or subsystem that is coupled to a processor through a communication channel.

Alternatively, the activity detection module 305 can be represented by one or more software applications (or even a combination of software and hardware, e.g., using Application Specific Integrated Circuits (ASIC)), where the software is loaded from a storage medium (e.g., I/O devices 306) and operated by the processor 302 in the memory 304 of the general purpose computing device 300. Thus, in one embodiment, the activity detection module 305 for detecting suspicious activities in secure locations described herein with reference to the preceding Figures can be stored on a computer readable medium or carrier (e.g., RAM, magnetic or optical drive or diskette, and the like).

Thus, the present invention represents a significant advancement in the field of activity detection and surveillance. A method and apparatus are provided that reduce false detection alarm rates by tracking low-level feature sets (representing people, objects, etc.) in a series of image frames over time. By identifying the relationships between the detected feature sets over time, it is substantially less likely that events such as occlusions or the merging of objects will generate a detection alarm, as is often the case with existing detection systems. The method may be tuned based on one or more criteria to detect different types of activities (e.g., loitering, perimeter breach, etc.) with varying degrees of sensitivity, such that at any given time, surveillance and detection may be optimized.

While the foregoing is directed to embodiments of the present invention, other and further embodiments of the invention may be devised without departing from the basic scope thereof, and the scope thereof is determined by the claims that follow.

The invention claimed is:

1. A computer implemented method for detecting a suspicious activity, comprising: using a computer processor for:
   detecting at least one low-level feature set in a plurality of frames of a sequence of scene imagery;
   determining frame-to-frame associations of said at least one low-level feature set; and
   determining whether said frame-to-frame associations are indicative of said suspicious activity;
   wherein said frame-to-frame associations are determined to be indicative of loitering if a path established by said frame-to-frame associations satisfies at least one predefined criterion,
   wherein said at least one predefined criterion includes at least one of: a minimum path length, a minimum confidence weight associated with said path, a minimum displacement during approximately a first half of said path, a maximum displacement over an entirety of said path and a maximum median instantaneous speed along said path.

2. The method of claim 1, wherein said low-level feature set represents a non-fixed part of a landscape of said scene imagery.

3. The method of claim 1, wherein said frame-to-frame associations represent a movement of said at least one low-level feature set over time.

4. The method of claim 1, wherein said frame-to-frame associations are determined in accordance with an optical flow-based analysis.

5. The method of claim 4, wherein a history of said frame-to-frame associations is modeled as a directed graph.

6. The method of claim 1, further comprising: generating an alert if said frame-to-frame associations are determined to be indicative of said suspicious activity.

7. The method of claim 1, wherein said determination as to whether said frame-to-frame associations are indicative of said suspicious activity is made in accordance with one or more predefined criteria.

8. The method of claim 7, wherein at least one of said one or more predefined criteria is user definable.

9. The method of claim 1, wherein said frame-to-frame associations are determined to be indicative of a perimeter breach if a path established by said frame-to-frame associations satisfies at least one predefined criterion.

10. The method of claim 9, wherein said at least one predefined criterion includes at least one of: a maximum path length, a minimum confidence weight associated with said path, path origination and transgression points occurring in different regions that are separated by said perimeter, a minimum average velocity at a time of transgression, a maximum average velocity at a time of transgression, a minimum instantaneous velocity at said time of transgression, a maximum instantaneous velocity at said time of transgression, an instantaneous direction at said time of transgression and a minimum percentage of an associated low-level feature set that transgresses said perimeter.

11. The method of claim 1, wherein said plurality of frames is every frame in a batch of frames of a predefined size.

12. The method of claim 11, wherein said frame-to-frame associations are analyzed over a predefined number of batches.

13. A non-transitory computer-readable storage medium having stored thereon a plurality of instructions, the plurality of instructions including instructions which, when executed by a processor, cause the processor to perform the steps of a method for detecting a suspicious activity, comprising:
   detecting at least one low-level feature set in a plurality of frames of a sequence of scene imagery;
   determining frame-to-frame associations of said at least one low-level feature set; and
   determining whether said frame-to-frame associations are indicative of said suspicious activity;
   wherein said frame-to-frame associations are determined to be indicative of loitering if a path established by said frame-to-frame associations satisfies at least one predefined criterion,
   wherein said at least one predefined criterion includes at least one of: a minimum path length, a minimum confidence weight associated with said path, a minimum displacement during approximately a first half of said path, a maximum displacement over an entirety of said path and a maximum median instantaneous speed along said path.

14. The non-transitory computer-readable storage medium of claim 13, wherein said frame-to-frame associations are determined to be indicative of a perimeter breach if a path established by said frame-to-frame associations satisfies at least one predefined criterion.

15. The non-transitory computer-readable storage medium of claim 14, wherein said at least one predefined criterion includes at least one of: a maximum path length, a minimum confidence weight associated with said path, path origination and transgression points occurring in different regions that are separated by said perimeter, a minimum average velocity at a time of transgression, a maximum average velocity at a time of transgression, a minimum instantaneous velocity at said time of transgression, a maximum instantaneous velocity at said time of transgression, an instantaneous direction at said time of transgression and a minimum percentage of an associated low-level feature set that transgresses said perimeter.

16. An apparatus for detecting a suspicious activity, comprising:
   a computer processor configured for:
   detecting at least one low-level feature set in a plurality of frames of a sequence of scene imagery;
   determining frame-to-frame associations of said at least one low-level feature set; and
   determining whether said frame-to-frame associations are indicative of said suspicious activity;
   wherein said frame-to-frame associations are determined to be indicative of loitering if a path established by said frame-to-frame associations satisfies at least one predefined criterion,
   wherein said at least one predefined criterion includes at least one of: a minimum path length, a minimum confidence weight associated with said path, a minimum displacement during approximately a first half of said path, a maximum displacement over an entirety of said path and a maximum median instantaneous speed along said path.

17. A computer implemented method for detecting a suspicious activity, comprising: using a computer processor for:
   detecting at least one low-level feature set in a plurality of frames of a sequence of scene imagery;
   determining frame-to-frame associations of said at least one low-level feature set; and
determining whether said frame-to-frame associations are indicative of said suspicious activity,
   wherein a history of said frame-to-frame associations is modeled as a directed graph, wherein the graph comprises a plurality of nodes which represent said at least one low-level feature set, wherein said plurality of nodes are connected by at least one arc which represents at least one connection established by flow-based analysis between at least two of the plurality of nodes at adjacent time instants.

18. The method of claim 17, wherein said at least one arc forms a path that represents said at least one low-level feature set across time and corresponds to at least one of said frame-to-frame associations of low-level feature sets as established by optical flow.

19. The method of claim 18, wherein a weight is associated with the at least one arc, wherein the weight provides a measure of confidence that the at least two nodes connected by the at least one arc are related.

20. The method of claim 17, wherein the at least one arcs is a path that represent the movement of the at least two nodes over time.

21. The method of claim 20, further comprising analyzing the path to determine whether movement (or lack of movement) of any the at least two nodes is indicative of suspicious behavior.

22. The method of claim 17, wherein said low-level feature set represents a non-fixed part of a landscape of said scene imagery.

23. The method of claim 17, further comprising: generating an alert if said frame-to-frame associations are determined to be indicative of said suspicious activity.

24. The method of claim 17, wherein said determination as to whether said frame-to-frame associations are indicative of said suspicious activity is made in accordance with one or more predefined criteria.

25. The method of claim 24, wherein at least one of said one or more predefined criteria is user definable.

26. The method of claim 17, wherein said frame-to-frame associations are determined to be indicative of loitering if a path established by said frame-to-frame associations satisfies at least one predefined criterion.

27. The method of claim 26, wherein said at least one predefined criterion includes at least one of: a minimum path length, a minimum confidence weight associated with said path, a minimum displacement during approximately a first half of said path, a maximum displacement over an entirety of said path and a maximum median instantaneous speed along said path.

28. The method of claim 17, wherein said plurality of frames is every frame in a batch of frames of a predefined size.

29. The method of claim 28, wherein said frame-to-frame associations are analyzed over a predefined number of batches.

* * * * *